United States Patent [19]
Chopin et al.

[11] 3,722,221
[45] Mar. 27, 1973

[54] POST-COMBUSTION REACTOR FOR EXHAUST GASES OF AN INTERNAL COMBUSTION ENGINE

[75] Inventors: Jean Chopin, Rueil-Malmaison; Jacques Eloy, Montbeliard, both of France

[73] Assignee: Automobiles Peugeot, Paris, France

[22] Filed: Dec. 13, 1971

[21] Appl. No.: 207,363

[30] Foreign Application Priority Data

Feb. 22, 1971 France.................................7105970

[52] U.S. Cl.....................60/282, 23/277 C, 60/322, 60/323, 60/305
[51] Int. Cl..............................................F01n 3/10
[58] Field of Search ..60/282, 322, 323, 305; 181/40; 23/277 C

[56] References Cited
UNITED STATES PATENTS 3,633,368    1/1972    Rosenlund...........................60/323
3,581,494    6/1971    Scheitlin..............................60/282

Primary Examiner—Douglas Hart
Attorney—Robert S. Swecker

[57] ABSTRACT

A treating reactor for exhaust gases of an internal combustion engine. It has three concentric tubular walls defining concentric chambers which intercommunicate. Inlet pipes connected to the outer wall extend through the inner walls with clearance and put the innermost chamber in communication with the exhaust pipes of the engine. An outlet connected to the outer wall puts the outermost chamber in communication with the exterior. The tubular walls are interconnected in pairs in a plane perpendicular to the axis of the reactor. The fixing points of one pair are staggered with respect to the fixing points of the other pair in said plane. Slidable guide means slidably interconnect adjacent end portions of the tubular walls.

14 Claims, 6 Drawing Figures

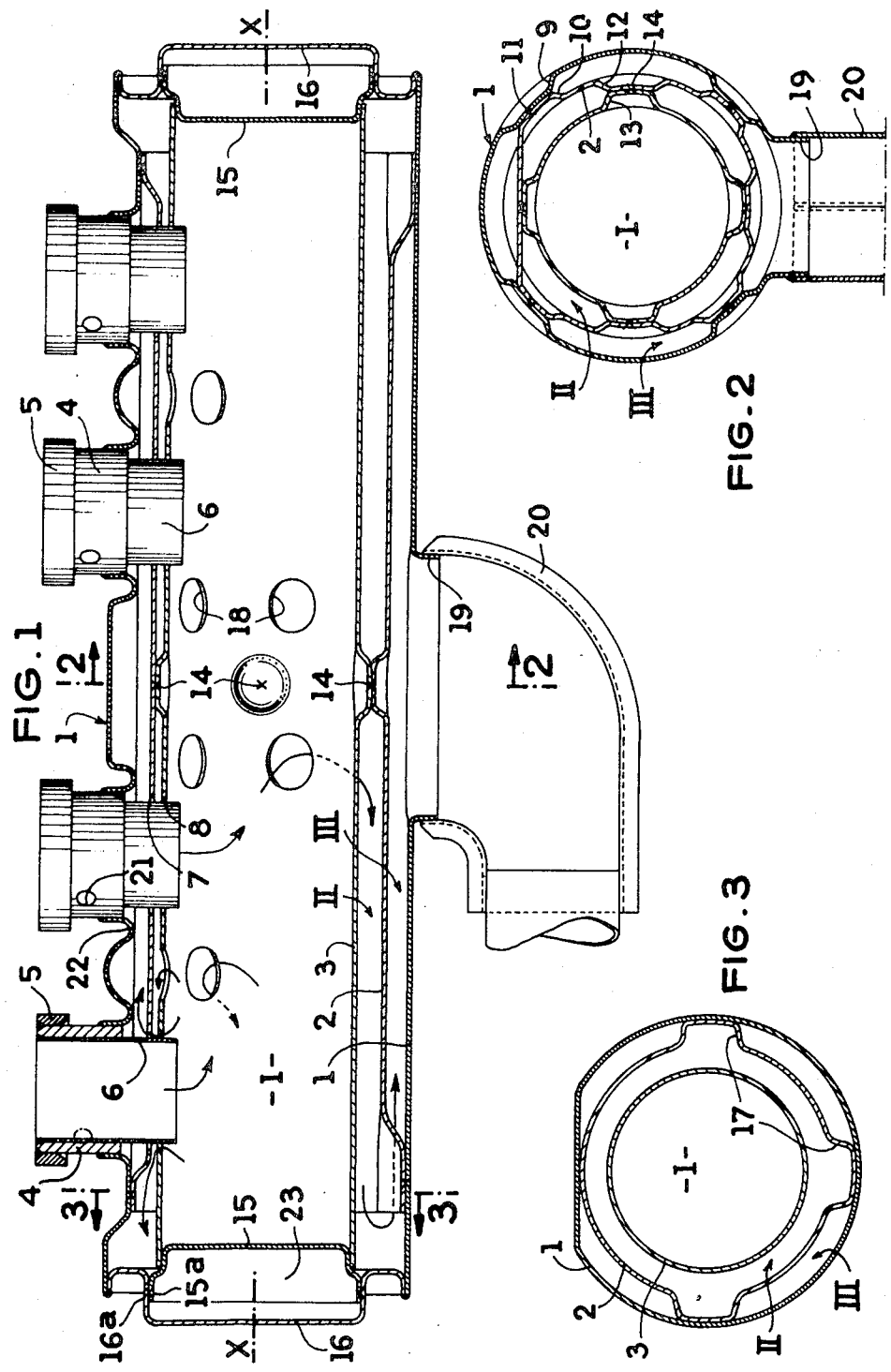

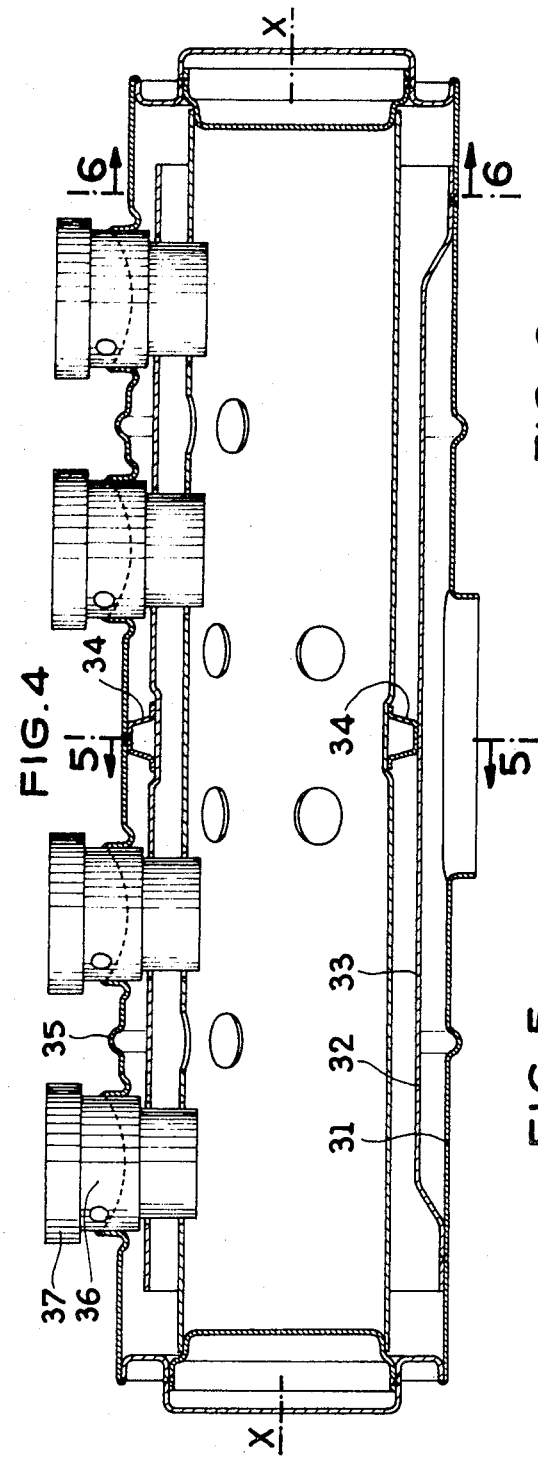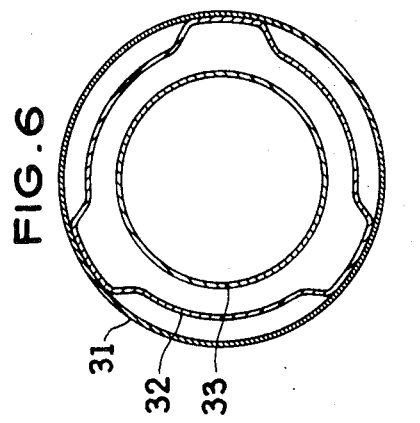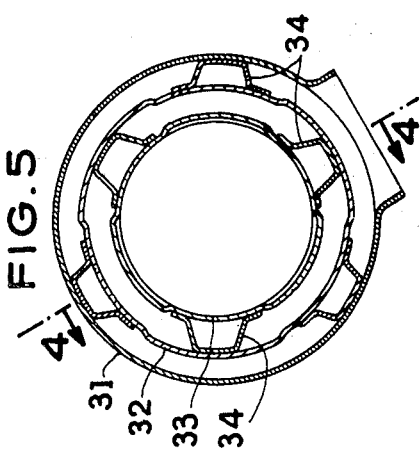

POST-COMBUSTION REACTOR FOR EXHAUST GASES OF AN INTERNAL COMBUSTION ENGINE

The present invention relates to devices for treating employed for reducing the pollution of atmospheric air by the exhaust gases of internal combustion engines and in particular engines having a controlled ignition.

It more particularly relates to reactors, known as post-combustion reactors, interposed in the path of the exhaust gases in the immediate vicinity of the outlet of the various cylinders or the various combustion chambers of the engine. These reactors usually comprise a plurality of concentric tubular walls which define a number of chambers, and passages putting the chambers in communication with each other so as to cause the exhaust gases to flow through a sinuous path between their inlet and outlet in the device. Means are moreover provided for providing an additional supply of air and ensure oxidation by a spontaneous combustion of the pollutants, such as carbon monoxide and the unburnt hydrocarbons.

Owing to the very function performed by such a reactor, its various constituent parts are subjected to temperature variations which are very different from each other, the variations being considerably greater for the internal wall which defines the chamber receiving the hot gases coming from the engine than for the outer wall. Consequently, high stresses are set up in the material and there is a danger of fracture of the assembling means between the adjacent walls.

A remedy for this serious drawback has already been envisaged which consists in connecting the inner and outer walls to respective radial pipes which are mounted concentrically one inside the other with a clearance and connected by common fixing flanges to the exhaust pipes of the cylinders. However, this arrangement is expensive and does not sufficiently eliminate the stresses due to the differences in expansion.

An object of the present invention is to remedy the aforementioned drawbacks by providing between the various walls a particularly simple connection and allowing a free expansion of all the component parts.

The invention provides a post-combustion reactor comprising a plurality of concentric tubular walls defining a plurality of chambers which communicate with each other, at least one inlet conduit opening into one of said chambers and at least one outlet conduit extending from another of said chambers, wherein said concentric walls are rendered integral with each other in pairs in a plane transverse to the axis of the reactor at fixing points disposed in staggered relation from one pair of walls to the other, slidable guide means being provided between adjacent end portions of said walls.

Further features and advantages of the invention will be apparent from the ensuing description with reference to the accompanying drawings.

In the drawings:

FIG. 1 is a longitudinal sectional view of a reactor according to the invention;

FIG. 2 is a cross-sectional view taken on line 2—2 of FIG. 1;

FIG. 3 is a cross-sectional view taken on line 3—3 of FIG. 1, and

FIGS. 4, 5 and 6 are views similar to FIGS. 1, 2 and 3 of a modification of the reactor according to the invention.

In the first embodiment shown in FIGS. 1-3, the post-combustion reactor according to the invention comprises three concentric tubular walls 1, 2 and 3 having a common axis X—X. Welded to the outer wall 1 are connecting pipes 4 which terminate in flanges 5 for connection to the exhaust outlets of each of the cylinders of a conventional explosion engine (not shown). Welded inside the pipes 4 are tubes 6 which extend with clearance through apertures 7, 8 formed in the intermediate wall 2 and inner wall 3.

In a median cross section corresponding to FIG. 2, the wall 1 has radially inwardly deformed deformations 9 which face outwardly deformed deformations 10 in the wall 2 so as to allow the two walls 1 and 2 to be interconnected by spot welds 11. In the same cross section, deformations 12 in the wall 2 which are deformed radially inwardly and deformations 13 in the wall 3 which are deformed radially outwardly enable the walls 2 and 3 to be interconnected by spot welds 14. These various deformations are obtained by a press operation and may have any suitable shape. The spot welds 11 and 14 are disposed in staggered relation roughly at the corners of two squares having the same center but offset 45°.

Each end edge of the wall 3 is welded to a cover 15 having a cylindrical portion 15a which is slidably mounted in a cover 16 which is welded to the end portion of the outer wall 1 and has a cylindrical wall portion 16a. Each end portion of the intermediate wall 2 is deformed in such manner as to define radially projecting portions 17 which ensure a slidable centering of the wall 2 inside the wall 1.

The concentric walls 1, 2 and 3 define an inner chamber I, an intermediate chamber II, and an outer chamber III and apertures 18 formed in the wall 3 put the chamber I in communication with the chamber II.

The outer wall 1 has in its lower part an outlet orifice 19 to which is connected a pipe 22 for discharging the burnt gases. Orifices 21 formed in each of the connecting pipes 4 enable additional air to be supplied in the known manner for the most-combustion of the gases coming from the cylinders of the engine.

It will be observed that the wall 1 is shaped about the pipes 4 in such manner as to have a corrugation 22 which allows slight angular movements of the pipes 4 and facilitates the connection of the flanges 5 to the engine and also allows deformations due to expansion.

When the engine is operating, the exhaust gases flow along the path indicated by the arrows (FIG. 1). They issue from the combustion chamber of the engine by way of the tubes 6, enter the chamber I, then the annular chamber II by way of the apertures 18 and then the annular chamber III by passing round the ends of the intermediate wall 2. These gases thereafter escape by way of the pipe 20. It will be observed that a part of the gases which enter the chamber I flow through the gaps 8 surrounding the tubes 6 to the chamber II and thence to the chamber III. The major part of these gases, however, flows through the aforementioned sinuous path. The post-combustion reaction takes place mainly in the center part I of the reactor so that the wall 3 is brought to a very high temperature, whereas the wall 1, which is remote from the wall 3 and in contact with the surrounding air, is at a lower temperature. Consequently, there are considerable differences in the expansions of the walls, but these expansions can occur with no longitudinal stress owing to the fact that the walls are interconnected only in the median cross section or plane and with no transverse stress owing to the staggered arrangement of the spot welds 11 and 14 which allow a certain radial movement in the region of the fixing points, as appears clearly from FIG. 2. The fact that there is provided a clearance between the tubes 6 and the intermediate wall 2 and inner wall 3 also contributes to the avoidance of such stresses in the region of the connecting tubes 4.

Also, it should be mentioned that the shape of the covers 15 and 16 enables them to perform three functions :

closing the ends of the walls 1 and 3;
centering the wall 3 in the wall 1;
creating a buffer chamber 23 affording a transition between the high internal temperature and the surrounding atmosphere whose temperature is substantially lower. This avoids heat losses in the inner chamber which would adversely affect the efficiency of the combustion and avoids an excessive temperature gradient in this region.

In the modification of the invention shown in FIGS. 4–6, the general arrangement is the same except that the various walls 31, 32 and 33 in the center cross section are no longer interconnected by means of projecting portions obtained by deforming the walls but by means of cups 34 which are welded to the walls and also disposed in the staggered relation. It will be understood that these cups may be replaced by simple strips having a U- or S-shaped section for example.

As seen in FIG. 4, additional annular corrugations 35 are provided in the wall 31. These corrugations still further reduce the stresses which might occur in this wall in the vicinity of the connecting pipes 36 owing to the external connections by means of the flanges 37.

This embodiment operates in the same manner and has the same advantages as the first embodiment, namely essentially absence of stresses due to differences in temperature and expansions owing in particular :

to the mode of connection by staggered points between the various concentric walls;
to the clearance between the inlet conduits and the inner and intermediate walls;
to the slidable guiding between the end portions of the walls;
to the presence of buffer chambers in the vicinity of said end portions.

All these features lead to the same result and can moreover be subjected to various modifications, for example as concerns the shape of the various component parts, the number and arrangement of the fixing points whose angular staggering can be more or less even, and the shape of the path through which the treated gasses flow, etc.

Having now described our invention what We claim and desire to secure by Letters Patent is :

1. A treating reactor having a longitudinal axis for the exhaust gases of an internal combustion engine, comprising a plurality of means defining concentric tubular walls defining a plurality of intercommunicating chambers, inlet means opening into one of said chambers, and outlet means extending from another of said chambers, means for rendering said concentric walls integral with each other in pairs in a plane transverse to said axis comprising fixing points disposed in staggered relation from one pair of walls to another pair of said walls, and slidable guide means between adjacent end portions of said walls.

2. A reactor as claimed in claim 1, wherein two adjacent walls respectively have projecting portions which project toward each other, said fixing points being located at contacting parts of said projecting portions.

3. A reactor as claimed in claim 1, comprising attached elements on one of said walls, the fixing points being located on said attached elements.

4. A reactor as claimed in claim 3, wherein the attached elements are U-shaped.

5. A reactor as claimed in claim 3, wherein the attached elements are S-shaped.

6. A reactor as claimed in claim 1, wherein the fixing points are disposed at corners of two squares having the same center and angularly offset 45° about said center from each other.

7. A reactor as claimed in claim 1, wherein the fixing points are located at corners of two equilateral triangles having the same center and angularly offset 60° from each other about said center.

8. A treating reactor having a longitudinal axis for treating exhaust gases of an internal combustion engine, comprising means defining an outer tubular wall, an intermediate tubular wall and an inner tubular wall, said tubular walls being concentric and defining a plurality of concentric chambers including an innermost chamber, means for putting said chambers in communication with each other, inlet pipes connected to said outer wall for connection to exhaust pipes, said inlet pipes extending through said inner and intermediate tubular walls with clearance and opening into said innermost chamber, outlet means connected to said outer wall for putting said chambers in communication with the exterior, first means for connecting said outer tubular wall to said intermediate tubular wall and second means for connecting said intermediate tubular wall to said inner tubular wall in a plane transverse to said axis, said first means having first fixing points and said second means having second fixing points, said first and second fixing points being in staggered relation to each other in said plane, and slidable guide means between adjacent end portions of said tubular walls.

9. A reactor as claimed in claim 8, wherein the outer tubular wall comprises around each of said inlet pipes a corrugated portion allowing a deformation of said outer tubular wall.

10. A reactor as claimed in claim 9, wherein the outer tubular wall comprises an annular corrugation between the inlet pipes.

11. A reactor as claimed in claim 1, wherein said slidable guide means comprise two cylindrical faces defined by two covers which respectively close end portions of an outermost tubular wall and an innermost tubular wall of said walls.

12. A reactor as claimed in claim 11, wherein said covers define a buffer chamber therebetween.

13. A reactor as claimed in claim 11, wherein said tubular walls include an intermediate tubular wall whose length is less than the lengths of the outermost tubular wall and the innermost tubular wall, slidable guide means being provided at each end of the intermediate wall whereby it is slidably guided with respect to an adjacent one of said tubular walls.

14. A reactor as claimed in claim 1, comprising means in said inlet means for supplying additional air.

* * * * *